United States Patent
Zhang

(10) Patent No.: US 9,523,565 B2
(45) Date of Patent: Dec. 20, 2016

(54) MEASURING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Bing-Jun Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 234 days.

(21) Appl. No.: 14/526,106

(22) Filed: Oct. 28, 2014

(65) Prior Publication Data

US 2016/0061577 A1    Mar. 3, 2016

(30) Foreign Application Priority Data

Aug. 29, 2014  (CN) .......................... 2014 1 0436359

(51) Int. Cl.
*G01B 5/00*    (2006.01)
*G01B 5/06*    (2006.01)

(52) U.S. Cl.
CPC ............. *G01B 5/061* (2013.01); *G01B 5/0004* (2013.01)

(58) Field of Classification Search
CPC ............................... G01B 5/0004; G01B 5/061
USPC ........................... 33/832, 833, 549, 551, 712
See application file for complete search history.

(56) References Cited

U.S. PATENT DOCUMENTS

| | | | | | |
|---|---|---|---|---|---|
| 4,625,413 | A * | 12/1986 | Possati | ..................... | G01B 7/12 33/501.1 |
| 6,363,620 | B1 * | 4/2002 | Goodjohn | ............ | G01B 5/0023 33/508 |
| 7,984,561 | B2 * | 7/2011 | Li | .......................... | G01B 11/24 33/551 |
| 2012/0246956 | A1 * | 10/2012 | Andersson | ............... | G01B 3/20 33/555.1 |
| 2014/0352162 | A1 * | 12/2014 | Holtzman | ............ | G01B 5/0023 33/508 |
| 2015/0128433 | A1 * | 5/2015 | Ward, Jr. | .............. | F01D 25/285 33/503 |
| 2016/0061577 | A1 * | 3/2016 | Zhang | .................. | G01B 5/0004 33/832 |

* cited by examiner

*Primary Examiner* — Yaritza Guadalupe-McCall
(74) *Attorney, Agent, or Firm* — Zhigang Ma

(57) ABSTRACT

A measuring device configured to measure height of a workpiece includes a base, an automatic positioning mechanism and a measuring mechanism. The automatic positioning mechanism includes a positioning block, two clamp modules, and a controlling module. An upper surface of the positioning block configured to hold the work piece is a curve. Each clamp module includes a clamp sliding block. One end of each clamp sliding block includes a trough. The controlling module includes two extending portions, and each extending portion includes a bevel. The two clamp sliding blocks are positioned between the two extending portions and resisted against the two bevels. Thus, the two bevels can move the two clamp sliding blocks. The measuring module includes a positioning sliding block and a measuring sliding block. The measuring sliding block is mounted in a pre-determined distance away from the base to measure the height of the work piece.

13 Claims, 6 Drawing Sheets

MEASURING DEVICE

FIELD

The subject matter herein generally relates to the field of measuring devices for measuring a height of workpieces.

BACKGROUND

A measuring device is configured to measure a height of a workpiece. The measuring device includes a positioning block, and a positioning pin is mounted on the positioning block. The workpiece is arranged on the positioning pin. A positioning rod is configured to position the workpiece to prevent the rotation of the workpiece. A distance sensor determines whether the workpiece is qualified or not.

BRIEF DESCRIPTION OF THE DRAWINGS

Implementations of the present technology will now be described, by way of example only, with reference to the attached figures.

DETAILED DESCRIPTION

Figure 1:
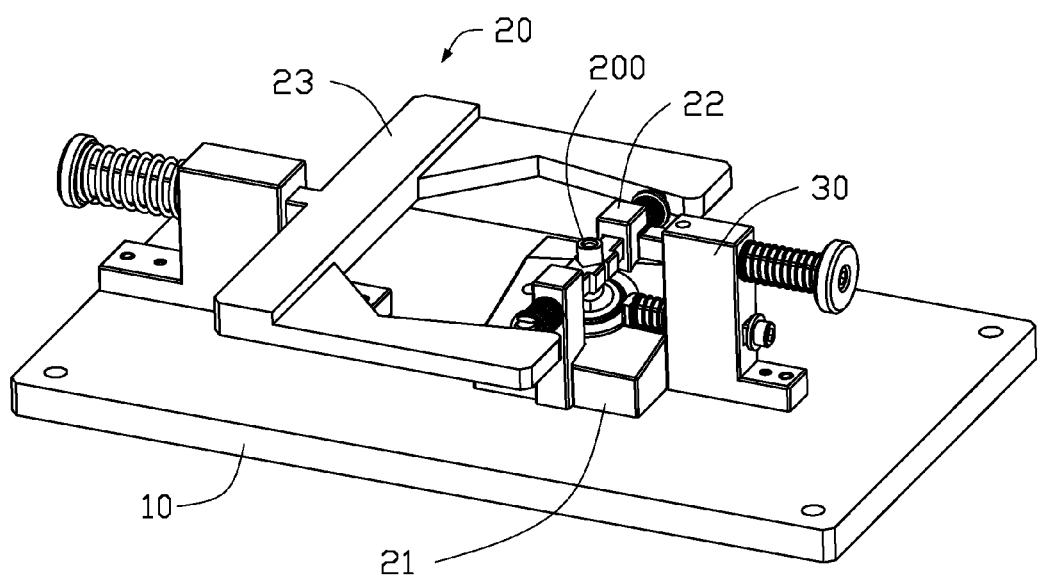
FIG. 1 is an isometric view of a measuring device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates a measuring device 100. The measuring device 100 can include a base 10, an automatic positioning mechanism 20, and a measuring mechanism 30. The base 10 can be a substantially rectangular plate. The automatic positioning mechanism 20 and the measuring mechanism 30 can be mounted on the base 10. The measuring mechanism 30 can be mounted opposite to the controlling module 23.

The automatic positioning mechanism 20 can include a positioning block 21 mounted on the base 10, two clamp modules 22 mounted to the opposite sides of the positioning block 21, and a controlling module 23 mounted to another side of the positioning block 21. A workpiece 200 to be measured can be placed on the positioning block 21. The two clamp modules 22 can be configured to clamp the workpiece 200. The controlling module 23 can be configured to control a distance between the two clamp modules 22. The measuring mechanism 30 can be configured to position the workpiece 200 and can measure whether or not the workpiece 200 is qualified.

Figure 2:
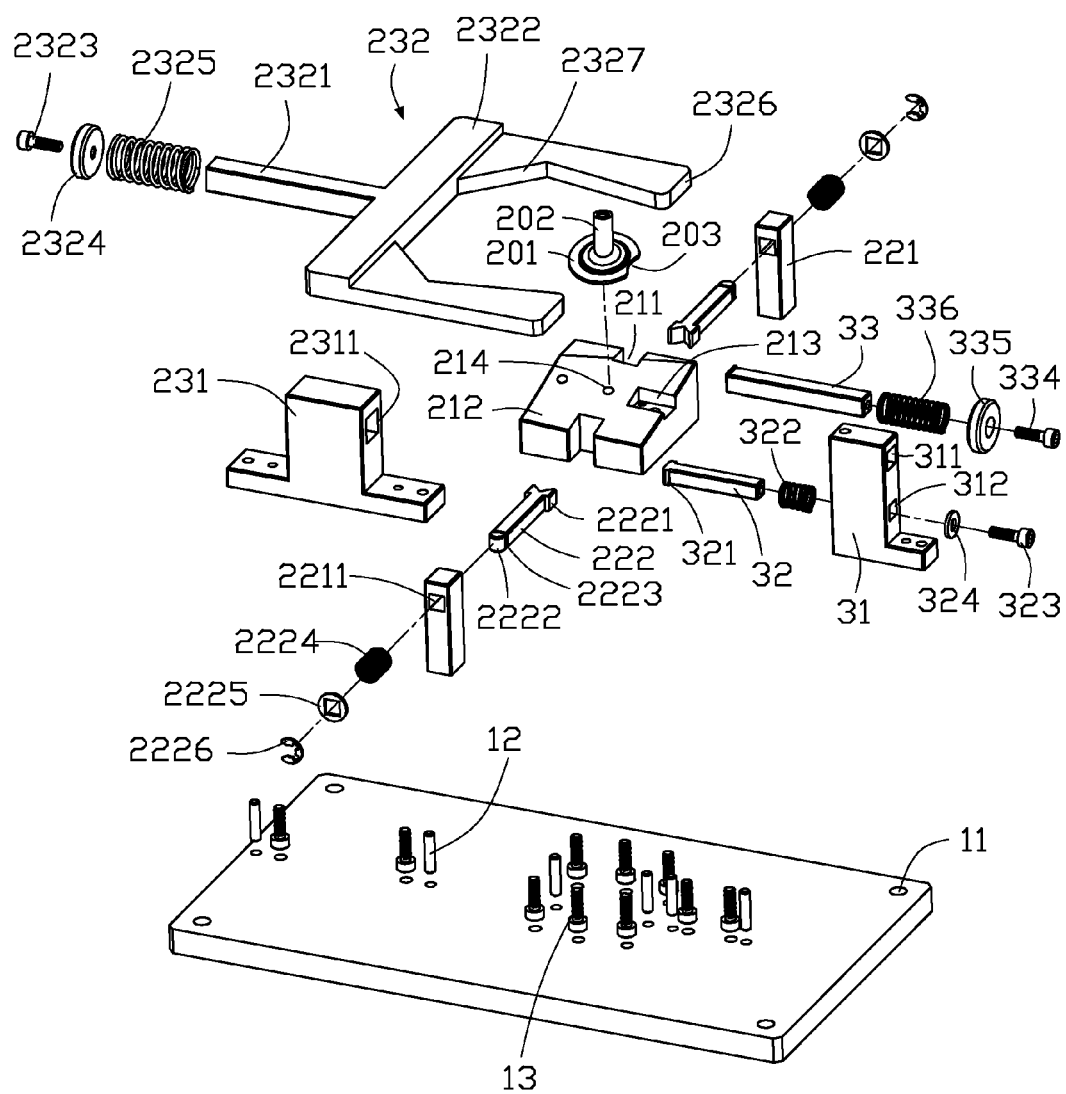
FIG. 2 is an exploded isometric view of the measuring device as shown in FIG. 1.

FIG. 2 illustrates that the workpiece 200 can include a base plate 201 and a column 202 coupled to the base plate 201. A positioning notch 203 can be defined in the base plate 201.

A plurality of through holes 11 can be defined in each corner of the base 10 (shown in FIG. 1). A plurality of positioning pins 12 can be arranged on the base 10 to accurately position the automatic positioning mechanism 20 and the measuring mechanism 30 on the base 10. A plurality of locking members 13 can be detachably arranged on the base 10 to detachably fix the automatic positioning mechanism 20 and the measuring mechanism 30 on the base 10.

The positioning block 21 can be configured to hold the workpiece 200. An upper surface 212 of the positioning block 21 can be a slanted curved surface. Two grooves 211 can be defined in the sides of the positioning block 21 adjacent to the two clamp modules 22. The two grooves 211 can be configured to receive the two clamp modules 22 to ensure the distances between the two clamp modules 22 and a central position 214 of the positioning block 21 are equal. A receiving groove 213 can be defined in the side of the positioning block 21 adjacent to the measuring mechanism 30 (shown in FIG. 1).

Each clamp module 22 can include a guiding block 221 and a clamp sliding block 222 mounted in the guiding block 221.

The guiding block 221 can be a cubic column and be mounted in the groove 211. A first through hole 2211 can be defined in the guiding block 221. The first through hole 2211 can be configured to mount the clamp sliding block 222. The clamp sliding block 222 can be slidable along the first through hole 2211.

One end of the clamp sliding block 222 can include a substantially "V"-shaped trough 2221. The trough 2221 can be configured to clamp the workpiece 200. The other end of the clamp sliding block 222 can include a substantially arc-shaped resisting portion 2222. An annular notch 2223 can be defined at an end adjacent to the resisting portion 2222. After the clamp sliding block 222 is slidably received in the first through hole 2211, an elastic element 2224 and a gasket 2225 can be sleeved around the clamp sliding block 222. One end of the elastic element 2224 can resist against the guiding block 221, and the other end of the elastic element 2224 can resist against the gasket 2225. A circlip 2226 can be fastened at the annular notch 2223. The circlip 2226 can resist against the gasket 2225 to prevent the gasket 2225 from sliding off the clamp sliding block 222.

The two troughs 2221 can combine clamping the workpiece 200 located on the upper surface 212. The axis of the workpiece 200 can be perpendicular to the base 10. A standard workpiece 200 can be positioned on the central position 214 of the upper surface 212 by the two troughs 2221. A height from the top of the column 202 to the base 10 can be defined as H.

The controlling module 23 can include a substantially "T" shaped support block 231 and an operation assembly 232 mounted to the support block 231. A second through hole 2311 can be defined in the support block 231 and can be configured to slidably mount the operation assembly 232.

The operation assembly 232 can include a slide portion 2321 and a pressing portion 2322 coupled to an end of the slide portion 2321.

The slide portion 2321 can run through the second through hole 2311, and can be slidable along the second through hole 2311. An elastic element 2325 can be sleeved around the slide portion 2321. A button 2324 can be fixed on one end of the slide portion 2321 away from the operation assembly 232 through a screw 2323. One end of the elastic element 2325 can resist against the support block 231, and the other end of the elastic element 2325 can resist against the button 2324. The pressing portion 2322 can be substantially "U" shaped and can include two extending portions 2326. Each side of the two extending portions 2326 opposite to each other can include a substantially "V" shaped bevel 2327. A distance between the two bevels 2327 can increase and then reduce with the extending of the extending portions 2326 from one end to the other end. The two bevels 2327 can resist against the two resisting portions 2222. The two bevels 2327 can be tangent with the arcs of the two resisting portions 2222 to reduce friction. In another embodiment, the distance between the two bevels 2327 can be reduced with the extending of the extending portions 2326 from one end adjacent to the slide portion 2321 to the other end.

The measuring mechanism 30 (shown in FIG. 1) can include a substantially "L" shaped fixing block 31, a substantially "T" shaped positioning sliding block 32, and a measuring sliding block 33.

The fixing block 31 can define a third through hole 311 and a fourth through hole 312. The third through hole 311 can be configured to slidably mount the measuring sliding block 33, and the fourth through hole 312 can be configured to slidably mount the positioning sliding block 32.

One end of the positioning sliding block 32 can include a bump 321, and a size of the bump 321 can be larger than a size of the fourth through hole 312. An elastic element 322 can be sleeved around the positioning sliding block 32. A button 324 can be fixed on one end of the positioning sliding block 32 by a screw 323. One end of the elastic element 322 can resist against the bump 321, and the other end of the elastic element 322 can resist against the fixing block 31. In the initial state, the positioning sliding block 32 can be received in the receiving groove 213, and can elastically resist in the positioning notch 203. The positioning sliding block 32 can be configured to position the workpiece 200.

A button 335 can be fixed on one end of the measuring sliding block 33 by a screw 334. An elastic element 336 can be sleeved around the measuring sliding block 33. One end of the elastic element 336 can resist against the fixing block 31, and the other end of the elastic element 336 can resist against the button 335.

Figure 3:
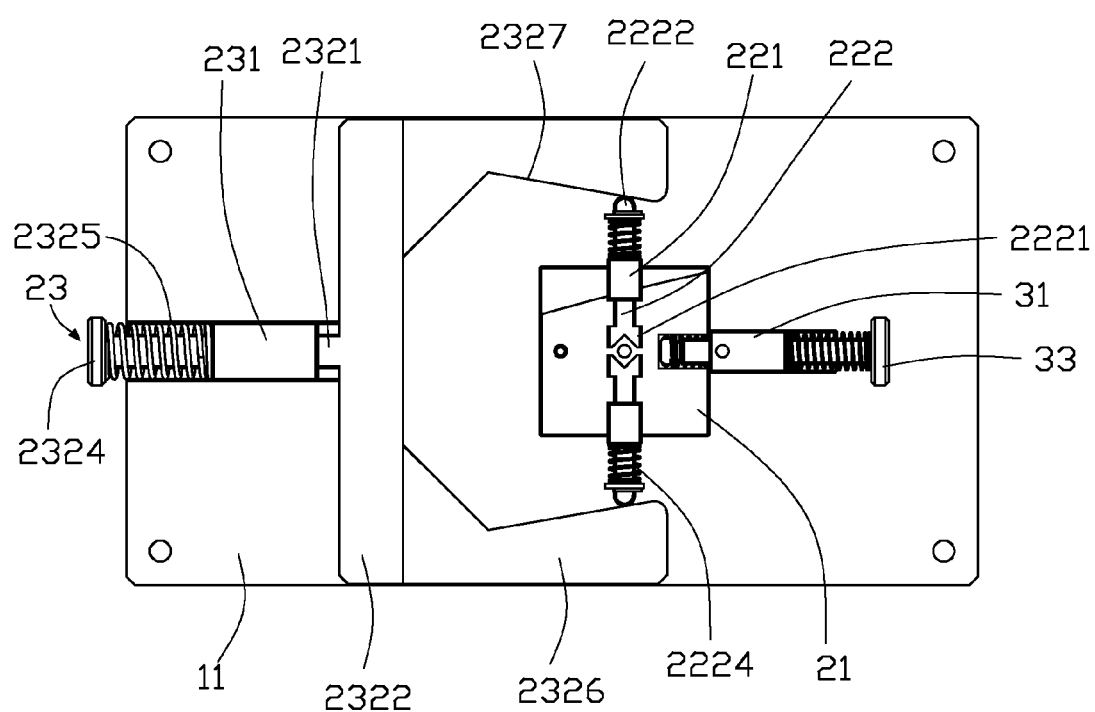
FIG. 3 is a top view of the measuring device of FIG. 1.

FIG. 3 illustrates that the two resisting portions 2222 can resist against one end of the extending portion 2326 away from the slide portion 2321 in the initial state. The two troughs 2221 can be closed, and the elastic element 2224 can be under compression. While driving the button 2324 towards the support block 231, the elastic element 2325 can be under compression, a distance between the two bevels 2327 resisting against the clamp sliding block 222 can increase. A distance between the two troughs 2221 can increase by the elastic force of the elastic element 2224. The workpiece 200 can be positioned between the two troughs 2221.

Once the force on the button 2324 has been removed, and the button 2324 can move away from the support block 231 by the elastic force of the elastic element 2325. The distance between the two bevels 2327 resisting against the clamp sliding block 222 can be reduced. The two bevels 2327 can resist against the clamp sliding block 222. The distance between the two troughs 2221 can be reduced until the workpiece 200 is steadily clamped between the two troughs 2221.

Figure 4:
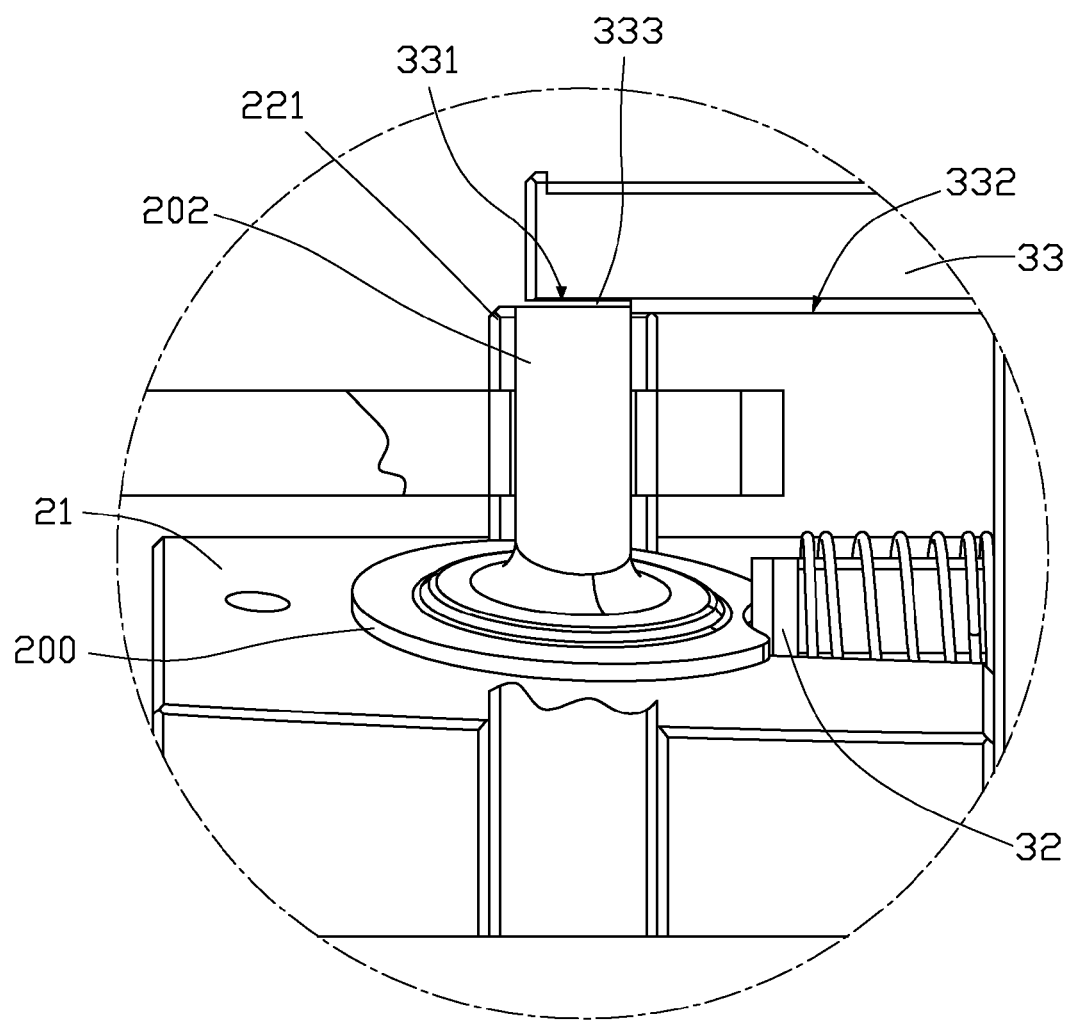
FIG. 4 is a partially enlarged view of the measuring device of FIG. 1 determining a height of a workpiece is qualified.

FIG. 4 illustrates that one end of the measuring sliding block 33 can include a first stepped surface 331, a second stepped surface 332, and a gap 333. The first stepped surface 331 and the second stepped surface 332 can be arranged in parallel, and a length of the first stepped surface 331 can be larger than a length of the second stepped surface 332. The manufacturing tolerance of the workpiece 200 can be defined as e. A height of the first stepped surface 331 from the base 10 can be equal to $H+e/2$, and a height of the second stepped surface 332 from the base 10 can be equal to $H-e/2$. The height difference between the first stepped surface 331 and the second stepped surface 332 can be equal to e.

The measuring sliding block 33 can be driven towards the workpiece 200, when the column 202 is partially received in the gap 333, the first stepped surface 331 is located above the column 202 and the second stepped surface 332 is resisted against the column 202, the height of the workpiece 200 can be qualified.

Figure 5:
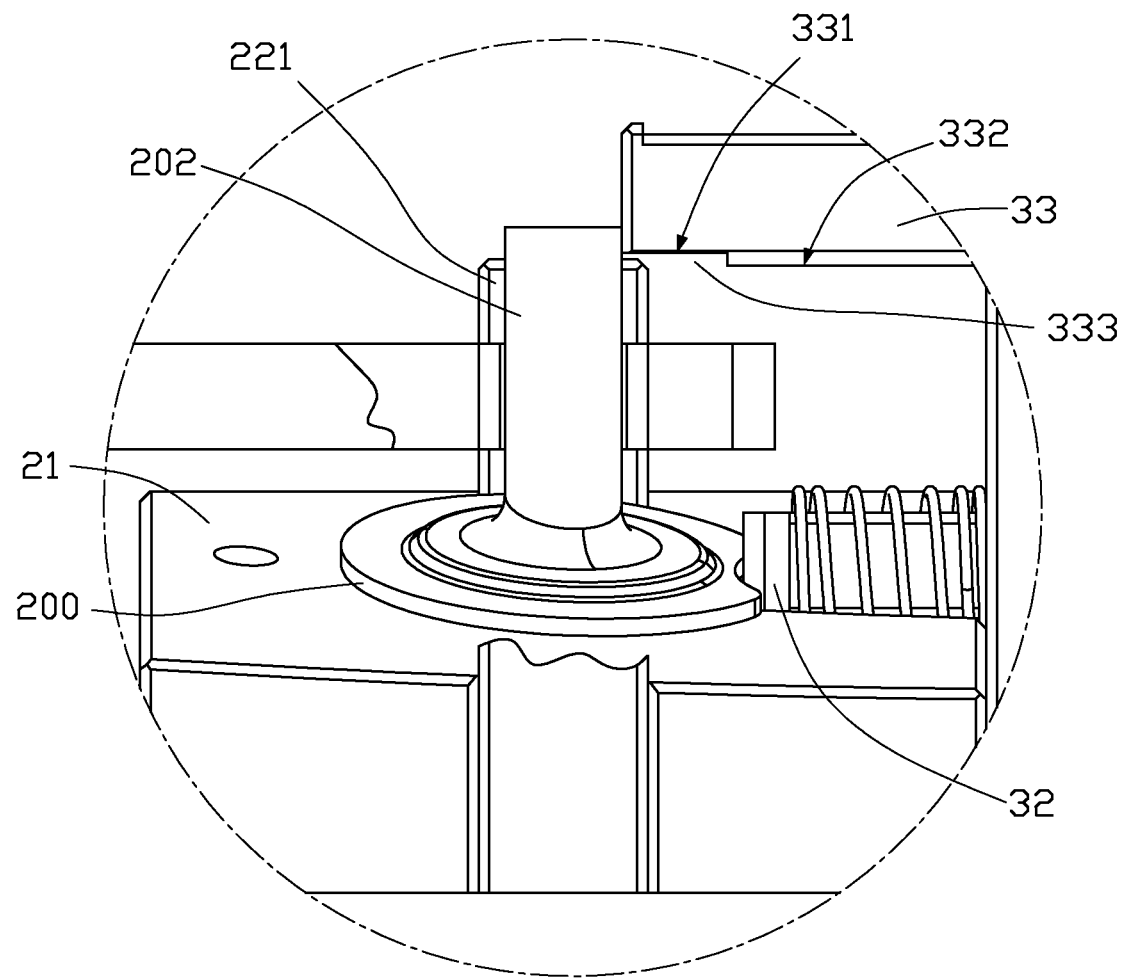
FIG. 5 is a partially enlarged view of the measuring device of FIG. 1 determining the height of the workpiece is measured as being too large.

FIG. 5 illustrates that the measuring sliding block 33 can be driven towards the workpiece 200, when the column 202 is not received in the gap 333 and the first stepped surface 331 are resisted against the column 202, the height of the workpiece 200 can be measured as being too large.

Figure 6:
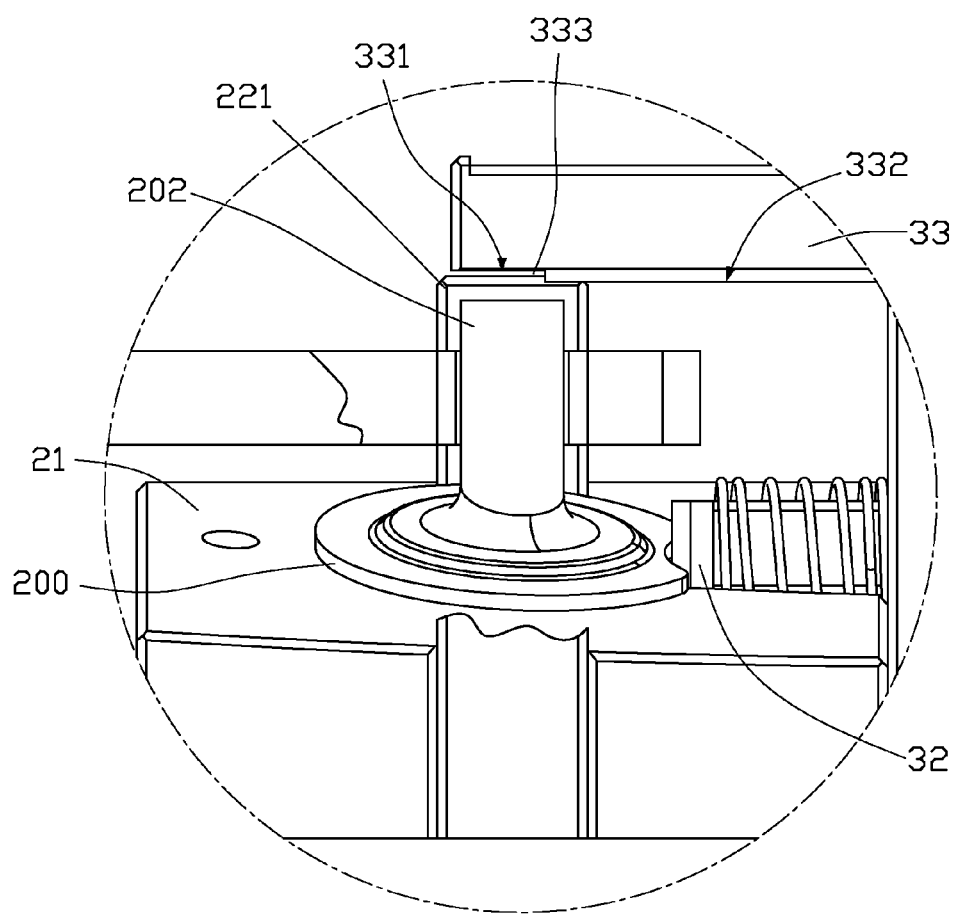
FIG. 6 is a partially enlarged view of the measuring device of FIG. 1 determining the height of the workpiece is measured as being too small.

FIG. 6 illustrates that the measuring sliding block 33 can be driven towards the workpiece 200, when the column 202 is not received in the gap 333, the first stepped surface 331 and the second stepped surface 332 are located above the column 202, the height of the workpiece 200 can be measured as being too small.

The embodiments shown and described above are only examples. Many details are often found in the art such as the other features of a measuring device 100. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A measuring device configured to measure the height of a workpiece, the measuring device comprising:
   a base;

an automatic positioning mechanism detachably mounted on the base, the automatic positioning mechanism having a positioning block, two clamp modules mounted to the opposite sides of the positioning block, and a controlling module mounted to another side of the positioning block, an upper surface of the positioning block being a curve configured to hold the workpiece, two grooves being defined in the sides of the positioning block respectively adjacent to the two clamp modules, each clamp module having a clamp sliding block slidably mounted to the base, one end of the clamp sliding block having a trough, the controlling module configured to move the two clamp sliding blocks having an operation assembly with two extending portions, each side of the two extending portions having a bevel, the two clamp sliding blocks positioning between the two extending portions and resisting against the two bevels; and a measuring mechanism detachably mounted on the base, the measuring mechanism having a positioning sliding block slidably mounted to the base, and a measuring sliding block mounted above the positioning sliding block, the positioning sliding block being configured to position the workpiece, the measuring sliding block and the base being in a predetermined distance to measure a height of the workpiece.

2. The measuring device as claimed in claim 1, wherein:
the measuring sliding block comprises a first stepped surface, a second stepped surface, and a gap;
a height difference between the first stepped surface and the second stepped surface is equal to a manufacturing tolerance of the workpiece; and
the height of the workpiece is qualified when the workpiece is partially received in the gap.

3. The measuring device as claimed in claim 1, wherein:
the measuring mechanism comprises a fixing block detachably mounted on the base;
a plurality of through holes are defined in the fixing block; and
the positioning sliding block and the measuring sliding block are slidably mounted through the through holes.

4. The measuring device as claimed in claim 3, wherein:
a button is detachably mounted on one end of the measuring sliding block;
an elastic element is sleeved around the measuring sliding block; and
one end of the elastic element resists against the fixing block, and the other end of the elastic element resists against the button.

5. The measuring device as claimed in claim 1, wherein a bump is arranged to one end of the positioning sliding block, and a button is fixed on the other end of the positioning sliding block.

6. The measuring device as claimed in claim 5, wherein:
an elastic element is sleeved around the positioning sliding block; and
one end of the elastic element resists against the bump, and the other end of the elastic element resists against the fixing block.

7. The measuring device as claimed in claim 1, wherein:
each clamp module comprises a guiding block detachably mounted on the base; and
a through hole is defined in the guiding block, wherein the through hole is configured to slidably mount the clamp sliding block.

8. The measuring device as claimed in claim 7, wherein one end of the clamp sliding block comprises a resisting portion and a circlip detachably mounted on the clamp sliding block.

9. The measuring device as claimed in claim 8, wherein:
an elastic element and a gasket is sleeved around the clamp sliding block; and
one end of the elastic element resists against the guiding block, and the other end of the elastic element resists against the gasket.

10. The measuring device as claimed in claim 1, wherein:
the controlling module further comprises a support block detachably mounted on the base; and
the support block defines a through hole configured to slidably mount the operation assembly.

11. The measuring device as claimed in claim 10, wherein:
the operation assembly comprises a slide portion and a pressing portion coupled to an end of the slide portion;
a button is detachably fixed on one end of the slide portion;
an elastic element is sleeved around the slide portion; and
one end of the elastic element resists against the support block, and the other end of the elastic element resists against the button.

12. The measuring device as claimed in claim 1, wherein one side of the positioning block adjacent to the measuring mechanism defines a receiving groove, and the receiving groove is configured to receive the positioning sliding block.

13. The measuring device as claimed in claim 1, wherein:
each corner of the base defines a plurality of through holes;
a plurality of positioning pins are arranged on the base; and
a plurality of locking members are detachably arranged on the base.

* * * * *